United States Patent
Chen et al.

(10) Patent No.: US 12,081,270 B2
(45) Date of Patent: Sep. 3, 2024

(54) DEVICE AND METHOD FOR DECODING AND EQUALIZING

(71) Applicant: HUAWEI TECHNOLOGIES CO., LTD., Shenzhen (CN)

(72) Inventors: Jie Chen, Wuhan (CN); Starovoit Ivan, Moscow (RU); Plotnikov Pavel, Moscow (RU); Hongchen Yu, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 26 days.

(21) Appl. No.: 17/981,223

(22) Filed: Nov. 4, 2022

(65) Prior Publication Data
US 2023/0072299 A1 Mar. 9, 2023

Related U.S. Application Data

(63) Continuation of application No. PCT/CN2020/088634, filed on May 6, 2020.

(51) Int. Cl.
*H04B 10/61* (2013.01)
*H04B 10/2507* (2013.01)
(Continued)

(52) U.S. Cl.
CPC ....... *H04B 10/541* (2013.01); *H04B 10/2507* (2013.01); *H04B 10/616* (2013.01); *H04B 10/6163* (2013.01); *H04B 10/6971* (2013.01)

(58) Field of Classification Search
CPC ................ H04B 10/541; H04B 10/616; H04B 10/6163; H04B 10/6971; H04B 10/2507; H04L 25/03
(Continued)

(56) References Cited

U.S. PATENT DOCUMENTS

| 8,700,976 B2 | 4/2014 | Gunnam et al. |
| 2009/0177945 A1 | 7/2009 | Djordjevic et al. |

(Continued)

FOREIGN PATENT DOCUMENTS

| CN | 1236229 A | 11/1999 |
| CN | 103688502 A | 3/2014 |

(Continued)

OTHER PUBLICATIONS

Arlunno et al., "Turbo Equalization for Digital Coherent Receivers," Journal of Lightwave Technology, vol. 32, No. 2, XP011536163, Total 10 pages (Jan. 15, 2014).

(Continued)

*Primary Examiner* — Li Liu
(74) *Attorney, Agent, or Firm* — Leydig, Voit & Mayer, Ltd.

(57) ABSTRACT

A device and method related to processing an optical signal so as to compensate nonlinear distortions of optic fibers are provided. The method includes: generating a first signal by equalizing the optical signal using a first DBP algorithm; generate a first sequence of LLRs by demapping and deinterleaving the first signal; generating a first sequence of bits by iteratively decoding the first sequence of LLRs for a first number of iterations; generating a sequence of QAM symbols by mapping and interleaving the first sequence of bits; generating a second signal by equalizing the first signal based on the sequence of QAM symbols using a second DBP algorithm; generating a second sequence of LLRs by demapping and deinterleaving the second signal; and generating a second sequence of bits by iteratively decoding the second sequence of LLRs for a second number of iterations.

20 Claims, 10 Drawing Sheets

(51) Int. Cl.
 H04B 10/54 (2013.01)
 H04B 10/69 (2013.01)
(58) Field of Classification Search
 USPC .................................................. 398/202, 208
 See application file for complete search history.

(56) References Cited

U.S. PATENT DOCUMENTS

| | | | | |
|---|---|---|---|---|
| 2011/0085624 | A1* | 4/2011 | Djordjevic | H04B 10/6971 375/340 |
| 2012/0051470 | A1 | 3/2012 | Schlegel et al. | |
| 2013/0091398 | A1* | 4/2013 | Djordjevic | H03M 13/255 714/752 |
| 2013/0170842 | A1* | 7/2013 | Koike-Akino | H04L 25/03171 398/208 |
| 2014/0099103 | A1* | 4/2014 | Djordjevic | H04B 10/616 398/25 |
| 2018/0091225 | A1* | 3/2018 | Wang | H04B 10/612 |

FOREIGN PATENT DOCUMENTS

| | | |
|---|---|---|
| CN | 104798323 A | 7/2015 |
| CN | 105988883 A | 10/2016 |
| EP | 2271039 B1 | 11/2012 |
| EP | 2790327 A1 | 10/2014 |
| EP | 3001570 A1 | 3/2016 |
| EP | 3352387 A1 | 7/2018 |
| WO | 2013103077 A1 | 7/2013 |
| WO | 2014150070 A2 | 9/2014 |

OTHER PUBLICATIONS

Sharma et al., "Design and Implementation of Efficient Turbo Equalizer for Noise Reduction," International Conference on Energy, Communication, Data Analytics and Soft Computing (ICECDS-2017), Total 6 pages (2017).

Yellepeddi et al., "Adaptive Equalization in a Turbo Loop," IEEE Transactions on Wireless Communications, vol. 14, No. 9, XP011668637, Total 12 pages, Institute of Electrical Electronics Engineers, New York, New York (Sep. 2015).

Tuchler et al., "Turbo Equalization: Principles and New Results," IEEE Transactions on Communications, vol. 50, No. 5, Total 14 pages, Institute of Electrical Electronics Engineers, New York, New York (May 2002).

Tripathy, "LLR Enhancement Model for a Turbo Equalizer," International Journal of Engineering Sciences and Emerging Technologies, vol. 3, Issue 1, Total 9 pages (Aug. 2012).

Tuchler et al., "Turbo Equalization: An Overview," IEEE Transactions on Information Theory, vol. 57, No. 2, Total 33 pages, Institute of Electrical Electronics Engineers, New York, New York (Feb. 2011).

Wang et al., "Turbo Equalization for High Baud-Rate Optical Transmission," Advanced Photonics Congress (BGPP, IPR, NP, Networks, NOMA, Sensors, SOF, SPPCom) OSA 2018, Total 2 pages (2018).

Oestreich et al., "Performance and Complexity of Turbo Equalizers for optical coherent Gbit/s Transmission with optimal and suboptimal Detection Strategies," Total 6 pages (Jul. 2013).

Ip et al., "Compensation of Dispersion and Nonlinear Impairments Using Digital Backpropagation," Journal of Lightwave Technology, vol. 26, No. 20, Total 10 pages (Oct. 15, 2008).

Santos et al., "A double EP-based proposal for turbo equalization," arXiv:1902.01186v1 [eess.SP], Total 5 pages (Feb. 4, 2019).

Muranov, "Survey of MMSE Channel Equalizers," University of Illinois, Chicago, Tech. Rep., Total 7 pages (2010).

Arlunno et al., Counteracting 16-QAM Optical Fiber Transmission Impairments With Iterative Turbo Equalization, IEEE Photonics Technology Letters, vol. 25, No. 21, Total 4 pages, Institute of Electrical Electronics Engineers, New York, New York (Nov. 1, 2013).

* cited by examiner

DEVICE AND METHOD FOR DECODING AND EQUALIZING

CROSS-REFERENCE TO RELATED APPLICATIONS

This application is a continuation of International Application No. PCT/CN2020/088634, filed on May 6, 2020, the disclosure of which is hereby incorporated by reference in its entirety.

TECHNICAL FIELD

The present disclosure relates to optical fiber transmission systems, and more particularly to processing received optical signals. In order to compensate distortions of optical fibers, the disclosure proposes a device and method for equalizing and decoding optical signals.

BACKGROUND

Distortions of optical fiber significantly decrease a throughput and distance of an optical channel. These distortions can be grouped in two types. One is linear distortion of the optical fiber, such as chromatic dispersion (CD), polarization dependent dispersion (PMD), polarization dependent loss (PDL), polarization dependent gain (PDG). This type of distortion can be compensated by different types of linear filters, and thus is not considered as a huge problem in optical systems. Another type of fiber distortion is non-linear distortion, such as self-phase modulation (SPM), cross-phase modulation (XPM) and four-wave mixing (FWM). Currently, modern nonlinear compensation algorithm cannot provide compensations for all nonlinear distortions in optical fiber.

Types of algorithms, which are usually used in present optical systems to compensate nonlinear distortions, include a perturbation based model (PBM) and digital back propagation model (DBP). However, PBM has a huge complexity and small performance for long haul solutions, which is the reason that a DBP equalizer is usually used to compensate nonlinear distortions of long optic fibers. The DBP algorithm is based on a split-step Fourier method. This method is an approximation of Manakov equation solution. However, a standard DBP algorithm can compensate only SPM distortions.

SUMMARY

In view of the above-mentioned problems and disadvantages, embodiments of the present invention aim to introduce an optical signal processing method to compensate nonlinear distortions. In particular, an objective is to improve a transmission performance in a long distance optical system. One aim is to increase a throughput of the optical system.

The objective is achieved by embodiments as provided in the enclosed independent claims. Advantageous implementations of the embodiments are further defined in the dependent claims.

A first aspect of the invention provides a device for processing an optical signal, the device being configured to: generate a first signal by equalizing the optical signal using a first DBP algorithm; generate a first sequence of log-likelihood ratios, LLRs by demapping and deinterleaving the first signal; generate a first sequence of bits by iteratively decoding the first sequence of LLRs for a first number of iterations; generate a sequence of QAM symbols by mapping and interleaving the first sequence of bits; generate a second signal by equalizing the first signal based on the sequence of QAM symbols using a second DBP algorithm; generate a second sequence of LLRs by demapping and deinterleaving the second signal; and generate a second sequence of bits by iteratively decoding the second sequence of LLRs for a second number of iterations.

Embodiments of the present invention propose a turbo algorithm, which is based on the DBP model. Such design can provide additional performance and also increase throughput of an optical system in comparison with other compensation algorithms. It should be noted that, the device according to the first aspect may comprise one of more units or components, such as an equalizer, encoder/decoder, mapper/demapper, and/or interleaver/deinterleaver, in order to implement defined functions. The first and the second DBP algorithm may be identical or similar algorithms. In addition, it should be noted that a LLRs sequence will be obtained after a decoding procedure, i.e. the iteratively decoding of the first sequence of LLRs, or the iteratively decoding of the second sequence of LLRs. Then, output LLRs (obtained after the decoding) can be further converted into bits, i.e., to generate the first sequence of bits, or to generate the second sequence of bits.

In an implementation form of the first aspect, the device is configured to: receive the optical signal over an optical channel; and perform a linear compensation on the optical signal before equalizing the optical signal.

Optionally, an input signal of a DBP equalizer, i.e., the signal before equalizing being performed, may be a signal after linear compensations.

In an implementation form of the first aspect, the linear compensation comprises a CD compensation and/or a multi-input multi-output (MIMO) filter.

In an implementation form of the first aspect, the device is configured to generate the first signal by equalizing the optical signal using a hard sliced signal calculated from the optical signal as a reference signal.

In this implementation, it is necessary to use a reference signal to correct the equalization process, for instance, the working of the DBP equalizer with blind XPM terms. Reference signals for blind XPM term may be hard sliced signals.

In an implementation form of the first aspect, the device is configured to: obtain a first output sequence of LLRs by iteratively decoding the first sequence of LLRs for the first number of iterations; and generate the first sequence of bits by converting the first output sequence of LLRs.

Notably, LLRs (i.e., the first output sequence of LLRs) can be obtained after the decoding. The output LLRs can be converted into bits and then converted into reference symbols, i.e., the sequence of QAM symbols.

In an implementation form of the first aspect, the device is configured to: calculate an extrinsic information sequence based on the first sequence of LLRs and the first output sequence of LLRs; and generate the second sequence of bits by iteratively decoding the second sequence of LLRs based on the extrinsic information sequence.

Optionally, the extrinsic information can be used to reduce the number of iterations for decoding the second sequence of LLRs.

In an implementation form of the first aspect, the device is configured to generate the first sequence of bits by iteratively decoding the first sequence of LLRs for two iterations, and/or generate the second sequence of bits by iteratively decoding the second sequence of LLRs for three iterations.

Notably, a LLRs sequence will be obtained after a decoding procedure, i.e. the iterative decoding of the first sequence of LLRs, or the iterative decoding of the second sequence of LLRs. Then, output LLRs (obtained after the decoding) can be further converted into bits, i.e., to generate the first sequence of bits, or to generate the second sequence of bits. In this implementation, two iterations and three iterations are selected for decoding the first and the second sequence of LLRs, respectively. Notably, different numbers of iterations may also be used.

In an implementation form of the first aspect, the device is configured to generate the first sequence of bits by decoding the first sequence of LLRs using a first forward error correction, FEC, decoder; and/or generate the second sequence of bits by decoding the second sequence of LLRs using a second FEC decoder.

Notably, FEC codes are per se known codes, which are widely used in modern optic systems.

In an implementation form of the first aspect, the first and/or the second FEC decoder is a turbo product code, TPC, decoder, or a low-density parity-check code, LDPC, decoder.

In particular, TPC code or LDPC code may be selected in this implementation.

In an implementation form of the first aspect, the device is configured to generate the sequence of QAM symbols by performing a Gray mapping on the first sequence of bits.

In an implementation form of the first aspect, the device is configured to generate the sequence of QAM symbols by mapping the first sequence of bits onto a quadrature amplitude modulation 16, QAM16, constellation.

Optionally, a QAM16 mapper/demapper may be used in this optical system.

In an implementation form of the first aspect, the device is configured to generate the first signal by equalizing the optical signal using the first DBP algorithm with a blind cross-phase modulation, XPM, compensation; and/or generate the second signal by equalizing the first signal using the second DBP algorithm with a blind XPM compensation.

Optionally, additional blind terms to compensate XPM distortions may be used in DBP algorithms.

A second aspect of the invention provides a method for processing an optical signal, comprising: generating a first signal by equalizing the optical signal using a first digital back propagation, DBP, algorithm; generating a first sequence of log-likelihood ratios, LLRs by demapping and deinterleaving the first signal; generating a first sequence of bits by iteratively decoding the first sequence of LLRs for a first number of iterations; generating a sequence of QAM symbols by mapping and interleaving the first sequence of bits; generating a second signal by equalizing the first signal based on the sequence of QAM symbols using a second DBP algorithm; generating a second sequence of LLRs by demapping and deinterleaving the second signal; and generating a second sequence of bits by iteratively decoding the second sequence of LLRs for a second number of iterations.

In an implementation form of the second aspect, the method further comprises: obtaining a first output sequence of LLRs by iteratively decoding the first sequence of LLRs for the first number of iterations; and generating the first sequence of bits by converting the first output sequence of LLRs.

In an implementation form of the second aspect, the method further comprises: calculating an extrinsic information sequence based on the first sequence of LLRs and the first output sequence of LLRs; and generating the second sequence of bits by iteratively decoding the second sequence of LLRs based on the extrinsic information sequence.

In an implementation form of the second aspect, the method further comprises: generating the first sequence of bits by iteratively decoding the first sequence of LLRs for two iterations, and/or generating the second sequence of bits by iteratively decoding the second sequence of LLRs for three iterations.

In an implementation form of the second aspect, the method further comprises: generating the first sequence of bits by decoding the first sequence of LLRs using a first forward FEC decoder; and/or generating the second sequence of bits by decoding the second sequence of LLRs using a second FEC decoder.

Implementation forms of the method of the second aspect may correspond to the implementation forms of the device of the first aspect. The method of the second aspect and its implementation forms achieve the same advantages and effects as described above for the device of the first aspect and its implementation forms.

A third aspect of the invention provides a computer program product comprising a program code for carrying out, when implemented on a processor, the method according to the second aspect and any implementation forms of the second aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which.

DETAILED DESCRIPTION OF EMBODIMENTS

Illustrative embodiments of method, device, and program product for efficient packet transmission in a communication system are described with reference to the figures. Although this description provides a detailed example of possible implementations, it should be noted that the details are intended to be exemplary and in no way limit the scope of the application.

Moreover, an embodiment/example may refer to other embodiments/examples. For example, any description including but not limited to terminology, element, process, explanation and/or technical advantage mentioned in one embodiment/example is applicative to the other embodiments/examples.

Figure 1:
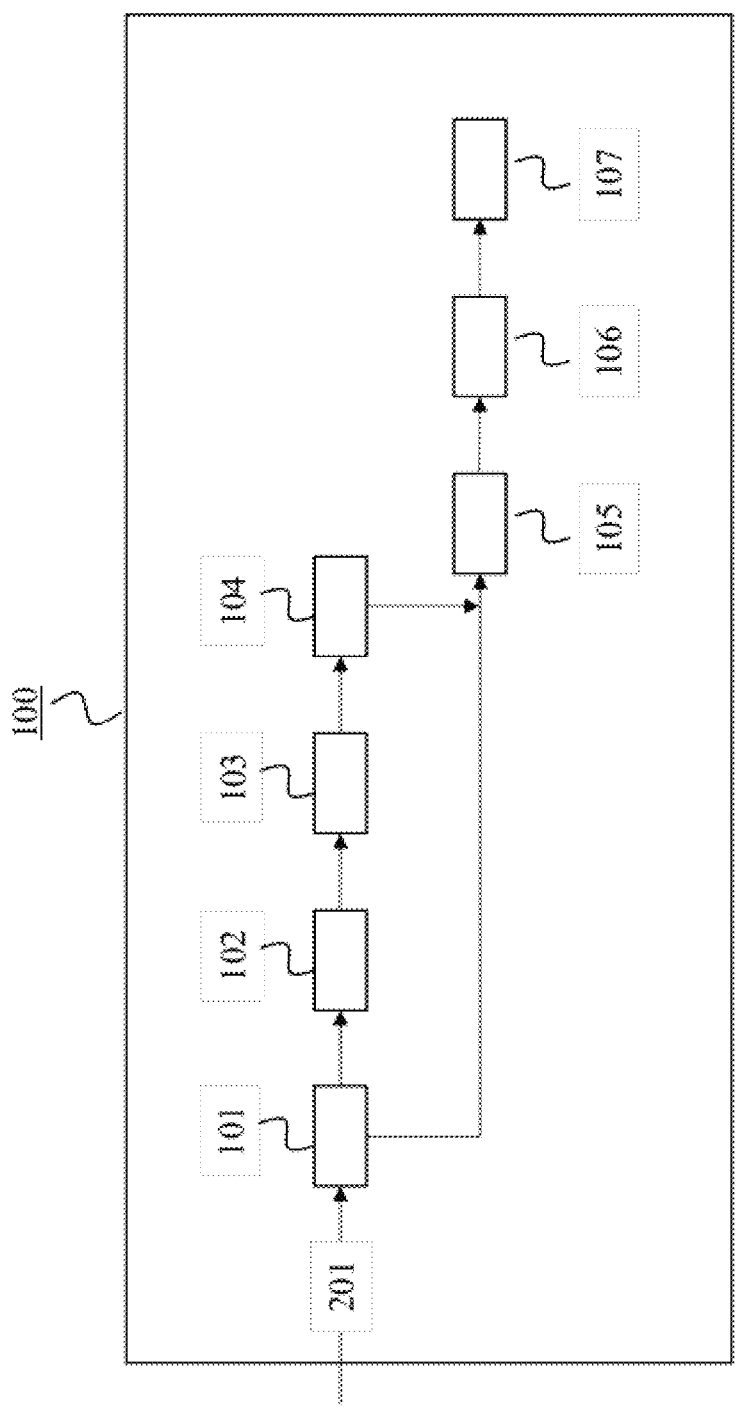
FIG. 1 shows a device according to an embodiment of the invention.

FIG. 1 shows a device 100 adapted for processing an optical signal 201 according to an embodiment of the invention. The device 100 may comprise processing circuitry (not shown) configured to perform, conduct or initiate the various operations of the device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The device 100 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the device 100 to be performed. In one embodiment, the processing circuitry comprises one or more processors and a non-transitory memory connected to the one or more processors. The non-transitory memory may carry executable program code which, when executed by the one or more processors, causes the device 100 to perform, conduct or initiate the operations or methods described herein.

In particular, the device 100 is configured to generate a first signal 101 by equalizing the optical signal 201 using a first DBP algorithm. The device 100 is further configured to generate a first sequence of LLRs 102 by demapping and deinterleaving the first signal 101. The device 100 is further configured to generate a first sequence of bits 103 by iteratively decoding the first sequence of LLRs 102 for a first number of iterations. Then the device 100 is configured to generate a sequence of QAM symbols 104 by mapping and interleaving the first sequence of bits 103. The device 100 is further configured to generate a second signal 105 by equalizing the first signal 101 based on the sequence of QAM symbols 104 using a second DBP algorithm. Then the device 100 is configured to generate a second sequence of LLRs 106 by demapping and deinterleaving the second signal 105. Further, the device 100 is configured to generate a second sequence of bits 107 by iteratively decoding the second sequence of LLRs 106 for a second number of iterations.

As previously explained, typically a LLRs sequence will be obtained after a decoding procedure, i.e. the iterative decoding of the first sequence of LLRs 102, or the iterative decoding of the second sequence of LLRs 106. Then, output LLRs (obtained after the decoding) can be further converted into bits, i.e., to generate the first sequence of bits 103, or to generate the second sequence of bits 107. That is, a decoder doesn't convert LLRs to bits, a further conversion step, from LLRs into bits, is needed herein.

Figure 2A:
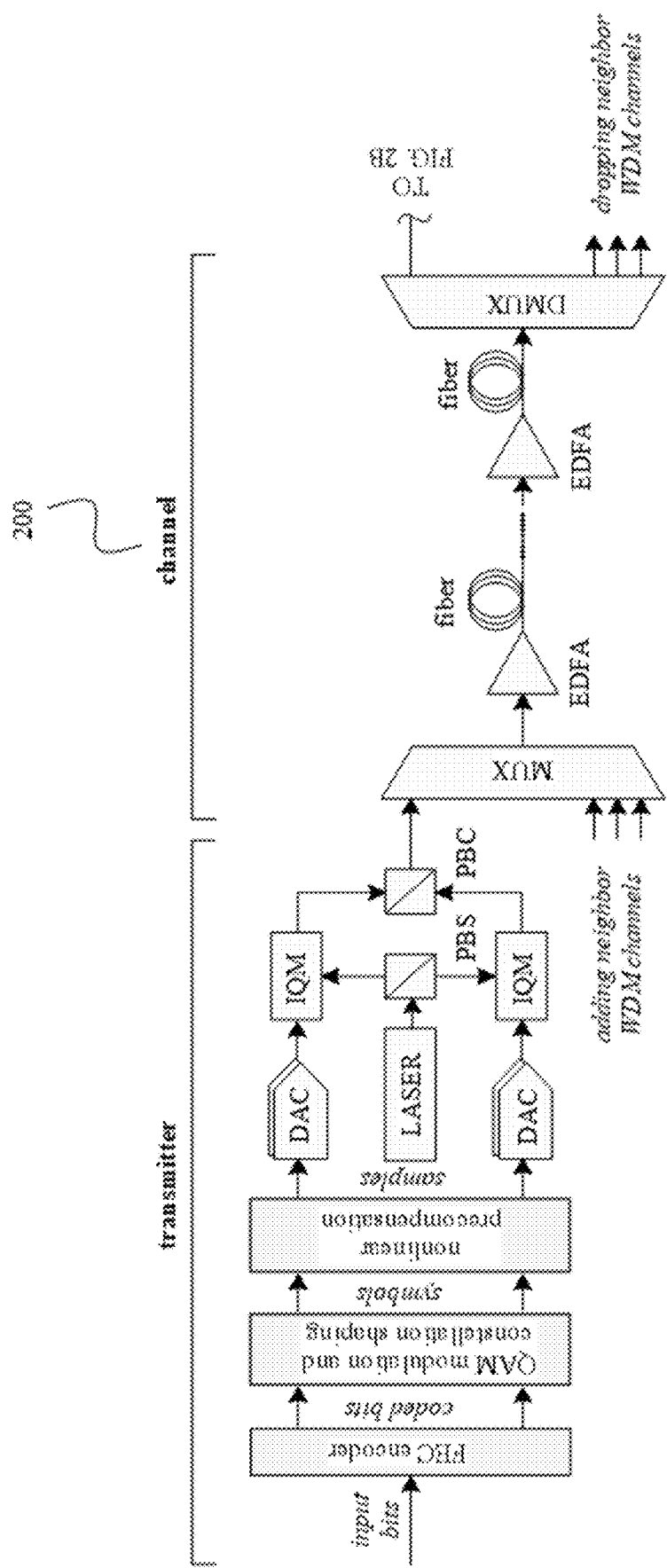
FIG. 2A and FIG. 2B shows an optical system according to an embodiment of the invention.
Figure 2B:
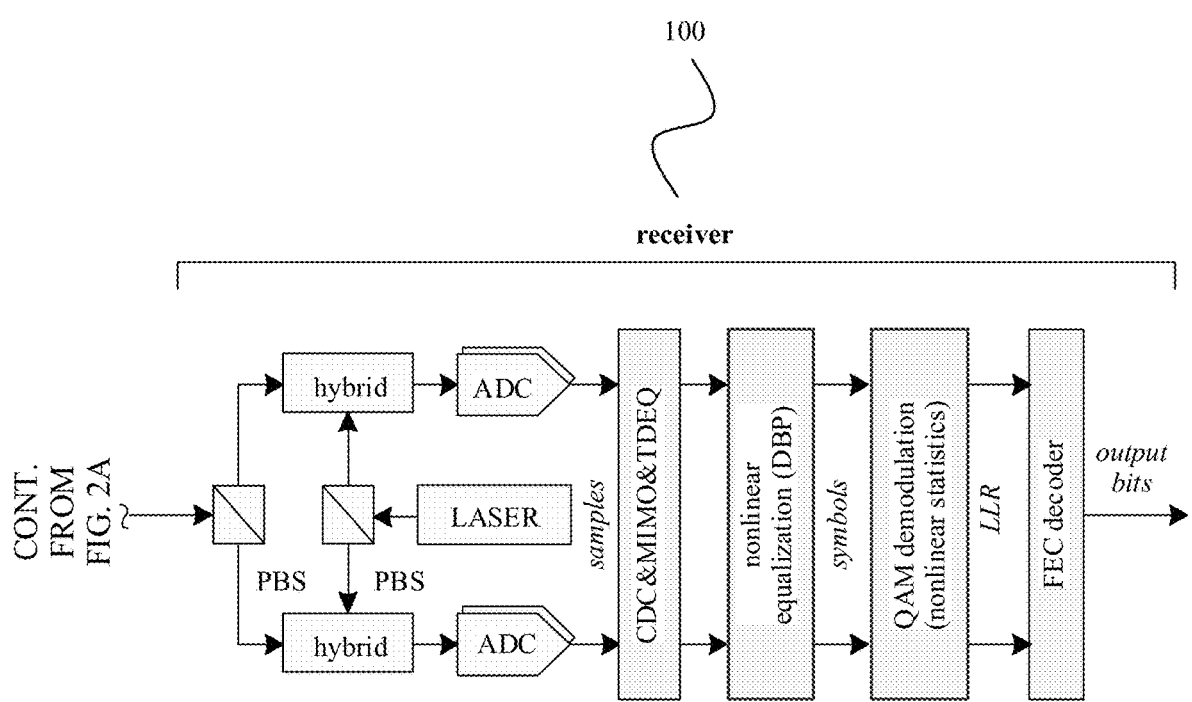

Optical systems may use FEC codes to provide an output bit error rate (BER) that is less than 1e-15. An optical system according to an embodiment of the invention is shown in FIG. 2A and FIG. 2B. For example, a turbo product code (TPC) or a low-density parity-check code (LDPC) can be used in optic systems. Decoders of these codes usually use several same iterations of decoding to achieve better performance. Every iteration of decoding may reduce BER level of the demapped symbols. One of the main ideas of this disclosure is the usage of several iterations of FEC decoder. And another idea is to use symbols, which are converted from received decoded bits, as a reference signal for DBP model, particularly the DBP model with blind XPM compensation. Proposed turbo algorithm, according to embodiments of the invention, which is based on DBP model, can provide additional performance and increase throughput of optical system in comparison with modern compensation algorithms. In addition, it should be noted that, the first DBP algorithm and the second DBP algorithm may be identical or similar algorithms.

Notably, according to an embodiment of the invention, the device 100 may be configured to receive the optical signal 201 over an optical channel 200 as shown in FIG. 2A and FIG. 2B. The device 100 may be further configured to perform a linear compensation on the optical signal 201 before equalizing the optical signal 201. In particular, the linear compensation may comprise a CD compensation and/or a MIMO filter.

Figure 3:
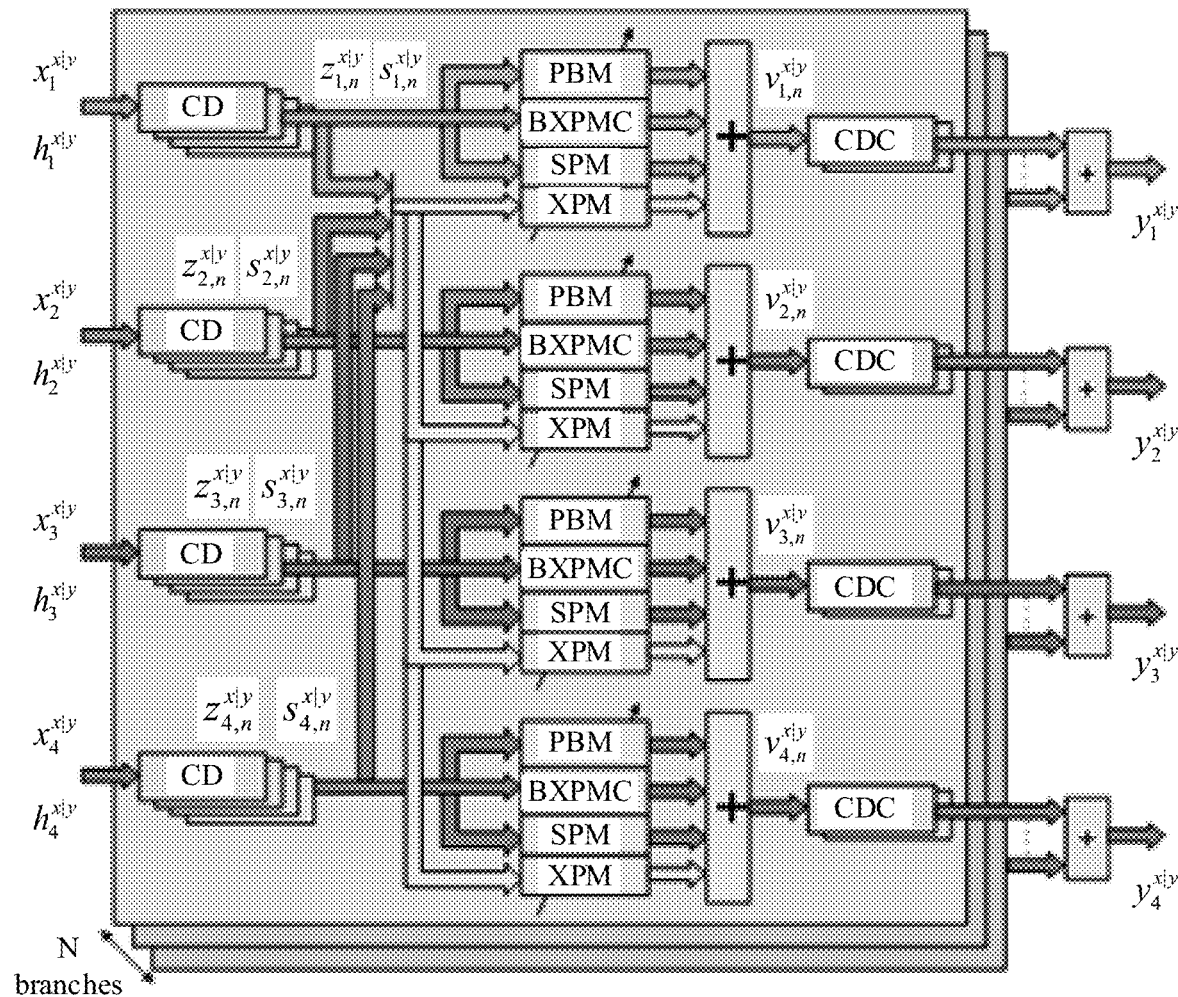
FIG. 3 shows a structure of a DBP algorithm with blind XPM compensations according to an embodiment of the invention.
Figure 4:
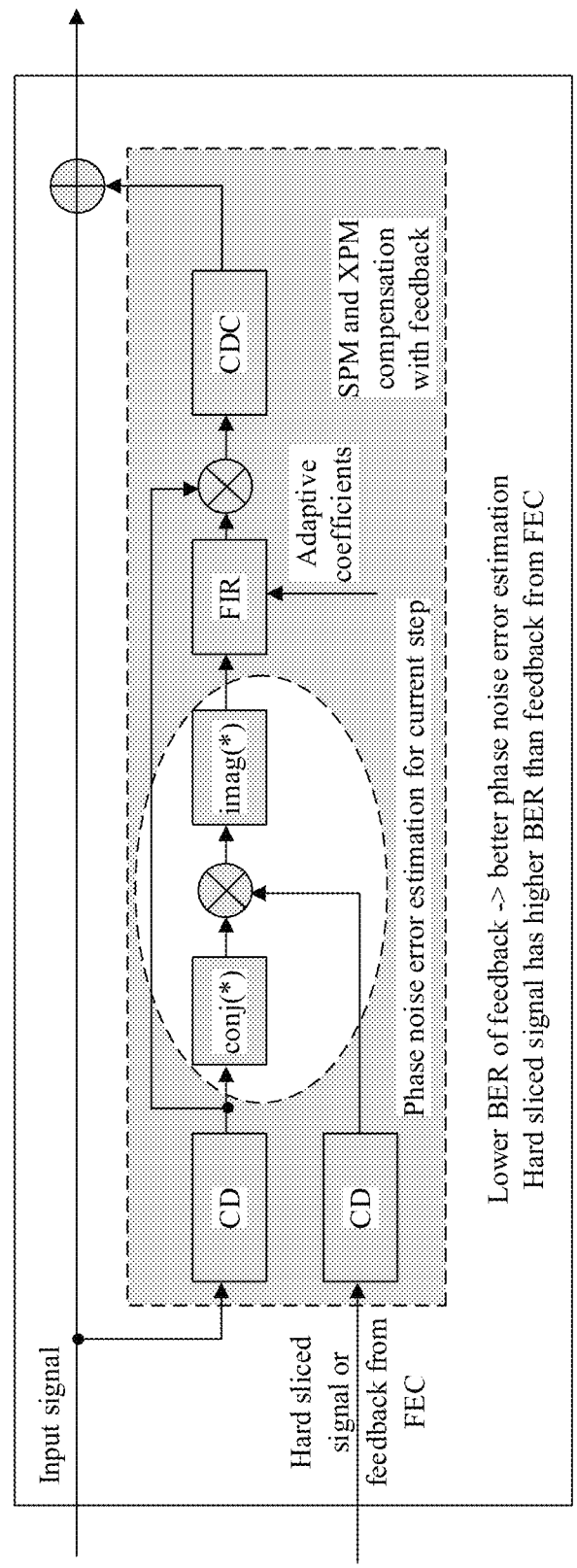
FIG. 4 shows a blind XPM compensation according to an embodiment of the invention.

Since standard DBP algorithms can compensate only SPM distortions, additional blind terms may be needed to compensate XPM distortion in DBP algorithm. A structure of DBP algorithm with blind XPM compensations is shown in FIG. 3. In particular, a structure of a blind XPM compensation is shown in FIG. 4.

SPM and XPM terms which are used in a DBP equalizer is represented in following equations:

$$\vec{y}_{n,X|Y} = \text{IFFT}(\text{FFT}(\vec{s}_{n,X|Y} \cdot [\vec{h}_{SPM} \otimes |\vec{s}_{n,X|Y}|^2]) \cdot H_{CDC,n}) \quad (1)$$

$$\vec{z}_{n,X|Y} = \text{IFFT}(\text{FFT}(\vec{s}_{n,X|Y} \cdot [\vec{h}_{XPM} \otimes \text{angle}(\vec{v}_{n,X|Y} \cdot \vec{s}_{n,X|Y}^*)]) \cdot H_{CDC,n}) \quad (2)$$

$$\vec{s}_{n,X|Y} = \text{IFFT}(\text{FFT}(\vec{x}_{X|Y}) \cdot H_{CD,n}) \quad (3)$$

$$\vec{v}_{n,X|Y} = \text{IFFT}(\text{FFT}(\vec{x}_{HS,X|Y}) \cdot H_{CD,n}) \quad (4)$$

where $\vec{y}_{n,X|Y}$ represents SPM terms, $\vec{z}_{n,X|Y}$ represents XPM terms, $H_{CDC,n}$ represents frequency response of compensation CD filter, n is the number of steps in the DBP equalizer, X, Y represents polarization states, $H_{CD,n}$ represents frequency response of CD filter, $\vec{x}_{X|Y}$ represents an input signal, and $\vec{x}_{HS,X|Y}$ represents a hard sliced signal.

Input signals of the DBP equalizer are signals after the linear compensation (e.g., CD compensation and MIMO filters). Also, reference signal(s) may be used for correct working of the DBP equalizer with blind XPM terms. Reference signals for blind XPM term may be hard sliced signals or hard decisions from FEC.

Conventionally, estimation of phase noise significantly depends on BER of hard sliced signals and BER of signals before DBP, which may be equal from 5e−2 to 4e−2. However, these values may not provide optimal usage of blind XPM terms. Decreasing of BER for reference signals decreases output BER of DBP equalizer with blind XPM terms.

A turbo algorithm based on the DBP model, which can provide additional performance and increase throughput of optical system in comparison with modern compensation algorithms, is thus proposed in this disclosure.

Figure 5:
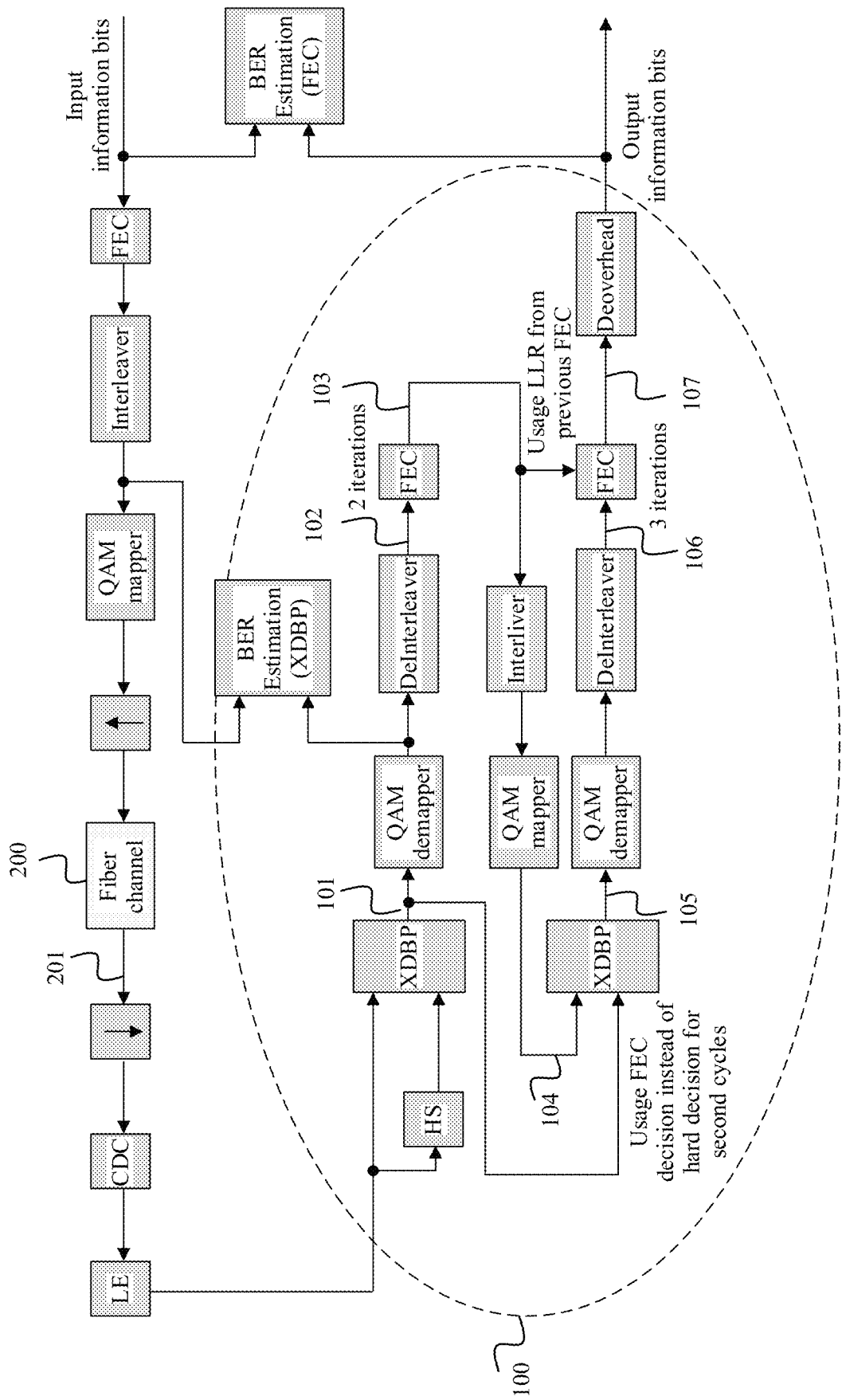
FIG. 5 shows a structure of a testbench with turbo DBP decoders according to an embodiment of the invention.

An exemplary structure of a test bench with proposed turbo DBP model, according to an embodiment of the invention, is shown in FIG. 5. This test bench comprises a transmitter, an optical channel 200 and a receiver. The transmitter includes TPC encoders (FEC encoder) to encrypt bits with current FEC codes, and QAM mappers to convert encrypted bits to QAM symbols. The receiver comprises a linear equalizer (to compensate CD and other linear effects of the optic channel 200), and turbo DBP decoders to compensate nonlinear distortions and decode symbols to bits. In particular, the receiver shown in FIG. 5 may be the device 100, as shown in FIG. 1.

According to embodiments of the invention, turbo approach with DBP comprises two turbo stages. In the first stage, the optical signal 201, which is received from the optic channel 200 (and after the linear compensation), is processed through DBP model (as shown in FIG. 3 and FIG. 4, equations (1)-(4)). The reference signal for the first DBP equalizer is a hard sliced (HS) signal which calculated from the received optical signal 201, as shown in FIG. 5.

The HS signal may be calculated as following:

$$x_{HS,X|Y}(k) = x_{HS,r,X|Y}(k) + ix_{HS,i,X|Y}(k) \quad (5)$$

$$x_{HS,r|i,X|Y}(k) = \begin{cases} 3, & x_{r|i,X|Y}(k) > 2 \\ 1, & 0 < x_{r|i,X|Y}(k) \leq 2 \\ -1, & -2 < x_{r|i,X|Y}(k) \leq 0 \\ -3, & x_{r|i,X|Y}(k) \leq -2 \end{cases} \quad (6)$$

where $x_{HS,r|i,X|Y}(k)$ represents a real or image part of hard sliced symbol, $x_{HS,r|i,X|Y}(k)$ represents a real or image part of input signal. The equation (6) is used if the modulation of signals is QAM16, different equations may be applied for other type of modulations.

After the first DBP processing, the first signal 101 generated from the optical signal 201, may be converted to LLRs (as shown in equation (7)) by a QAM demapper as following:

$$LLR(k) = \ln \frac{\sum_{n \in N(0)} P_n^0 e^{\frac{(x-x_n^0)^2}{2\delta^2}}}{\sum_{n \in N(1)} P_n^1 e^{\frac{(x-x_n^1)^2}{2\delta^2}}}, \quad (7)$$

where LLR(k) represents an output LLR, x represents a real or image part of an input symbol, $x_n^0$ represents values of QAM symbols for 0 bits, $x_n^1$ represents values of QAM symbols for 1 bits, δ represents a dispersion of noise.

After converting symbols into LLRs, a deinterleaving will further be performed. Interleaver and deinterleaver are used to protect FEC decoder from block errors. In this way, the first sequence of LLRs 102 is generated, as shown in FIG. 5.

According to an embodiment of the invention, the next step of the first turbo stage is decoding LLRs using a FEC decoder. FEC decoder can be different types but it must provide iterative processing of LLRs. TPC encoder and decoder can be used in an implementation of this invention. The TPC decoder may iteratively decode the first sequence of LLRs 102 as shown in FIG. 5. For instance, two iterations of the TPC decoder can reduce BER of LLRs, then LLRs that are interleaved and converted to bits, i.e., the first sequence of bits 103. After that, the first sequence of bits 103 can be mapped to reference symbols for next turbo stage.

The first sequence of bits 103 or the second sequence bits 107 can be represent as:

$$b(k) = (1 - \text{sign}[LLR(k)])/2 \quad (8)$$

where LLR(k) represents the first or second output LLRs, sign [*] represents a function returns sign of LLRs.

In addition, extrinsic information may be calculated after first FEC decoder (equation 9). This extrinsic information may be used for a FEC decoder in the second turbo stage.

$$\Delta(k) = LLR_{out}(k) - LLR_{in}(k), \quad (9)$$

That is, optionally, the device 100 may be configured to obtain a first output sequence of LLRs by iteratively decoding the first sequence of LLRs 102 for the first number of iterations. Then, the device 100 may be further configured to generate the first sequence of bits 103 by converting the first output sequence of LLRs.

According to an embodiment of the invention, the device 100 may be configured to calculate an extrinsic information sequence based on the first sequence of LLRs 102 and the first output sequence of LLRs. Then, the device 100 may be further configured to generate the second sequence of bits 107 by iteratively decoding the second sequence of LLRs 106 based on the extrinsic information sequence. The extrinsic information may be used to reduce the number of iteration in the second turbo stage, particularly for the FEC decoder.

As previously explained, typically a LLRs sequence will be obtained after a decoding procedure, i.e. the iterative decoding of the second sequence of LLRs 106. That is, an output LLRs sequence (obtained after the decoding) is further converted into bits, i.e., to generate the second sequence of bits 107.

Notably, the second turbo stage may share the same or similar structure as the first turbo stage (as shown in FIG. 5), but it have two differences. One difference is that, a reference signal used for the second DBP equalizer is the signal which is recalculated after the first turbo stage. Another difference is a summation of extrinsic information and LLRs from a second demapper.

For instance, according to an embodiment of the proposed invention, one implementation is test with following conditions shown in Table 1.

TABLE 1

| № | Parameters | Values |
|---|---|---|
| | simulation conditions | |
| 1 | Number of channels | 24 |
| 2 | Modulation | 16 QAM |
| 3 | Baudrate | 72 Gs |
| 4 | Channel spacing | 75 GHz |
| 5 | Chromatic dispersion | 16.89 ps/(nm*km) |
| 6 | Fiber attenuation | 0.22 dB/km |
| 7 | lambda | 1550 nm |
| 8 | Gamma | 1.1654 [1/(W*km)] |

TABLE 1-continued simulation conditions

| № | Parameters | Values |
|---|---|---|
| 9 | Length of fiber | 1520 km |
| 10 | Length of span | 80 km |
| 11 | Modeling step | 0.01 km |
| 12 | Length of FFT for simulation | 2^16 |
| 13 | Input power | 6 dBm |

Figure 6:
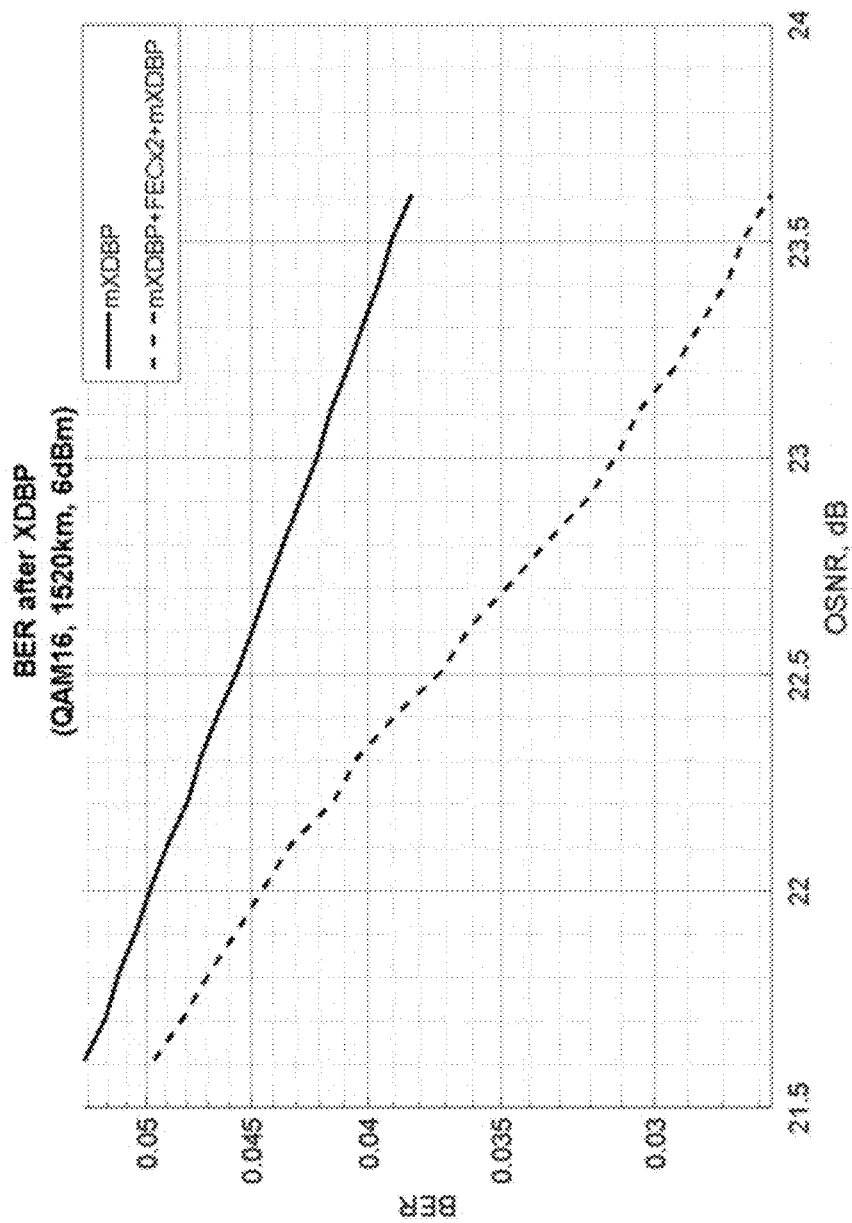
FIG. 6 shows a result of simulation according to an embodiment of the invention.
Figure 7:
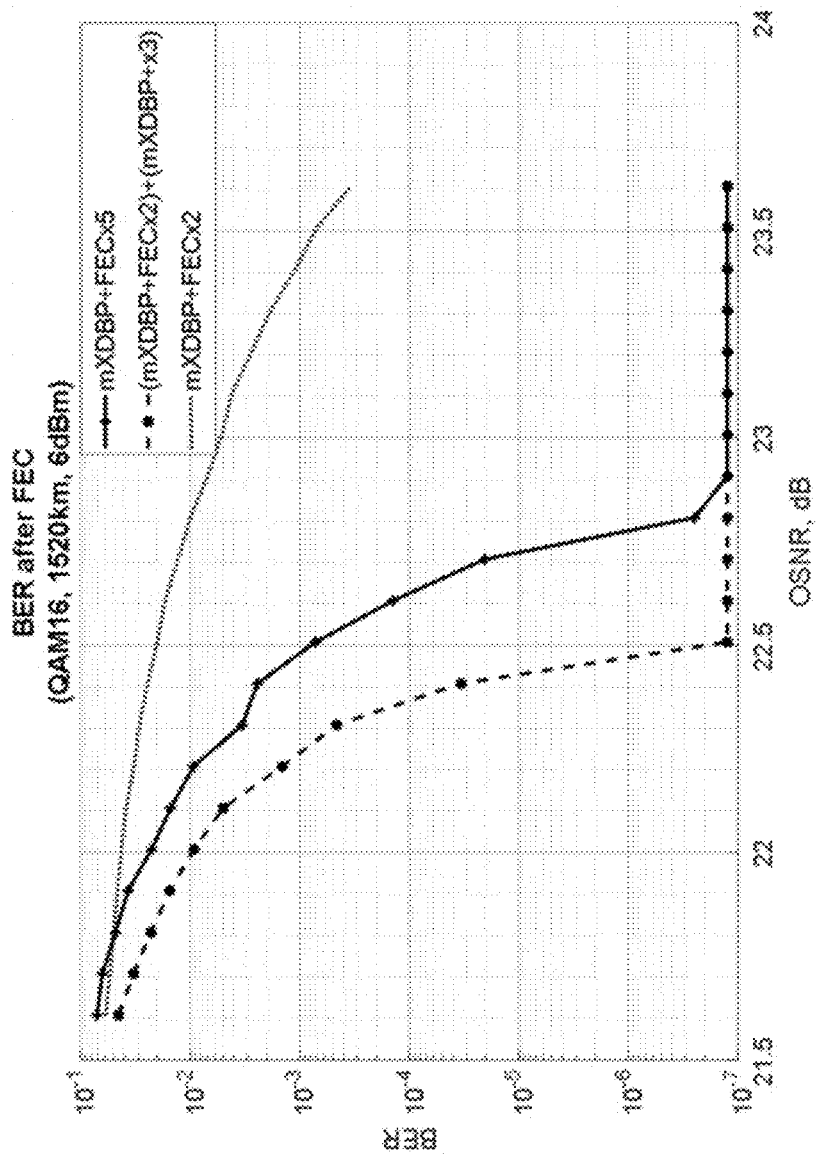
FIG. 7 shows a result of simulation according to an embodiment of the invention.

Results of this simulation are represented in FIG. 6 and FIG. 7. In this example, an OSNR improvement after the second DBP equalizer is 0.5 dB (BER level is 4.5e−2) in comparison with the first DBP equalizer. Also an improvement after the second FEC decoder is equal to 0.3 dB OSNR (BER level 1e−7) in comparison with a reference result. DBP equalizer and five iteration of FEC decoder are used as the reference result in the simulation tests. Notably, turbo approaches have additional OSNR improvement in comparison with conventional approaches.

To summarize, an idea of this disclosure is a combination of FEC decoder and nonlinear compensation equalizer. In particular, the equalizer is based on DBP models with blind XPM compensations, in order to increase compensations of XPM distortions. This idea can be separated into two secondary ideas. One is the usage of a hard decision from FEC decoder to increase XPM compensations of DBP models. Another one is the usage of extrinsic information from first FEC decoder to reduce number of iterations for second FEC decoder. Together, embodiments of this invention provide a new turbo DBP decoder.

Figure 8:
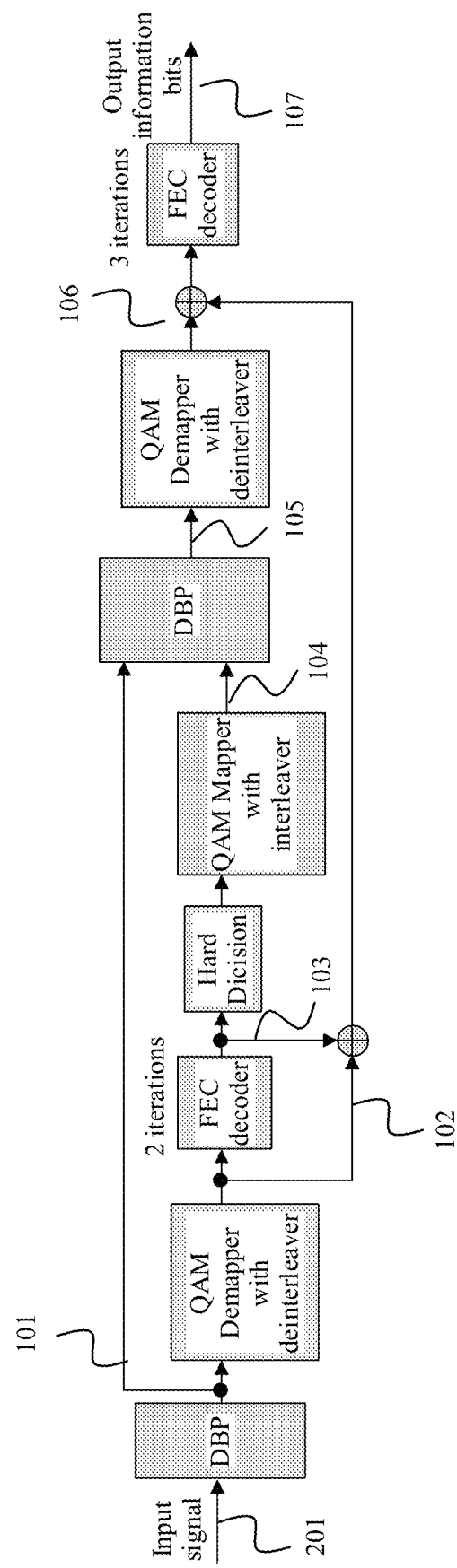
FIG. 8 shows a structure of turbo decoder with DBP equalizers according to an embodiment of the invention.

According to an embodiment of the invention, a structure of turbo decoder with DBP equalizers is shown in FIG. 8. This turbo decoder with DBP equalizer comprises two turbo stages and a feedback converter.

A first turbo stage includes DBP equalizer, QAM16 demapper, deinterleaver, and 2 iterations of TPC decoder. Second turbo stage includes DBP equalizer, QAM16 demapper, deinterleaver and 3 iterations of TPC decoder. Feedback converter includes LLRs to bits converter (hard decision), interleaver, and QAM16 mapper.

Notably, a structure of the DBP equalizers is as represented in FIG. 3 and FIG. 4. Mathematical equations for the calculation of nonlinear SPM and XPM terms are represented as in equation (1)-(4). Parameters of the DBP equalizer are shown in Table 2.

TABLE 2

Parameters of DBP

| № | Parameters | Values |
|---|---|---|
| 1 | Number of steps (n) | 3 |
| 2 | Number of coefficients for SPM terms (length of vector $\vec{h}_{SPM}$) | 21 |
| 3 | Number of coefficients for XPM terms (length of vector $\vec{h}_{XPM}$) | 44 |
| 4 | FFT size for CD and CDC filters | 2048 |
| 5 | Overlapping of CD and CDC filters | 50% |

The QAM demapper converts symbols to LLRs, in particular, using equation (7) as previously described. Deinterleaver and interleaver have same structures. For instance, the interleaver separates signals on blocks with 40000 samples. Each block of symbols is reshaped in matrix with 200×200 elements then matrix is transposed. Modified matrix is reshaped to block with 40000 symbols. Received blocks of symbols is combined together in output signal. TPC decoder is used in an embodiment of the invention as FEC decoder. Parameters of TPC decoder are represented in the following table.

TABLE 3

Parameters of TPC encoder and decoder

| № | Parameters | Values |
|---|---|---|
| 1 | Size of matrix before coding (block of input symbols) | 106 × 106 |
| 2 | Size of matrix after coding (block of encoded symbols) | 128 × 128 |
| 3 | Overhead of TPC | 15% |
| 4 | Number of iteration for first turbo loop | 2 |
| 5 | Number of iteration for second turbo loop | 3 |

Notably, LLRs to bits converter may be performed fully based on mathematical equation (7). QAM16 mapper may convert bits to symbols by using Gray mapping. Input signals for proposed turbo decoder is output signal after optical channel and linear compensation of fiber distortion. Output signal is decoded bits after two turbo stages.

Figure 9:
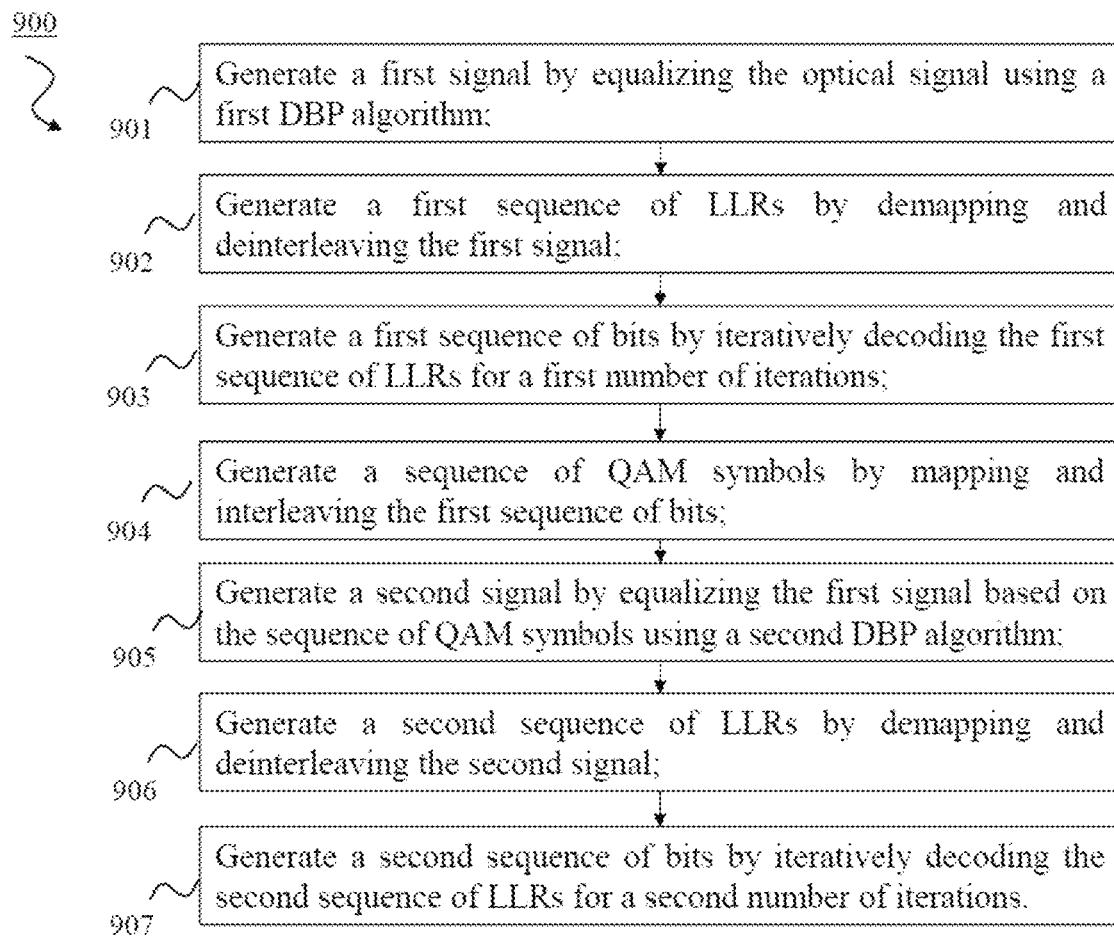
FIG. 9 shows a method according to an embodiment of the invention.

FIG. 9 shows a method 900 according to an embodiment of the invention, particularly for processing an optical signal 201. The method 900 comprises: a step 901 of generating a first signal 101 by equalizing the optical signal 201 using a first DBP algorithm; a step 902 of generating a first sequence of LLRs 102 by demapping and deinterleaving the first signal 101; a step 903 of generating a first sequence of bits 103 by iteratively decoding the first sequence of LLRs 102 for a first number of iterations; a step 904 of generating a sequence of QAM symbols 104 by mapping and interleaving the first sequence of bits 103; a step 905 of generating a second signal 105 by equalizing the first signal 101 based on the sequence of QAM symbols 104 using a second DBP algorithm; a step 906 of generating a second sequence of LLRs 106 by demapping and deinterleaving the second signal 105; and a step 907 of generating a second sequence of bits 107 by iteratively decoding the second sequence of LLRs 106 for a second number of iterations.

As previously explained, typically a LLRs sequence will be obtained after a decoding procedure, i.e. the iterative decoding of the first sequence of LLRs 102, or the iterative decoding of the second sequence of LLRs 106. Then an output LLRs sequence (obtained after the decoding) can be further converted into bits, i.e., to generate the first sequence of bits 103, or to generate the second sequence of bits 107. That is, a decoder doesn't convert LLRs to bits, a further conversion step, from LLRs into bits, is needed herein.

Optionally, according to an embodiment, the method may further comprise: obtaining a first output sequence of LLRs by iteratively decoding the first sequence of LLRs 102 for the first number of iterations; and generating the first sequence of bits 103 by converting the first output sequence of LLRs.

Optionally, according to an embodiment, the method may further comprise: calculating an extrinsic information sequence based on the first sequence of LLRs 102 and the first output sequence of LLRs; and generating the second sequence of bits 107 by iteratively decoding the second sequence of LLRs 106 based on the extrinsic information sequence.

Optionally, according to an embodiment, the method may further comprise: generating the first sequence of bits 103 by iteratively decoding the first sequence of LLRs 102 for two iterations, and/or generating the second sequence of bits 107 by iteratively decoding the second sequence of LLRs 106 for three iterations.

Optionally, according to an embodiment, the method may further comprise: generating the first sequence of bits 103 by decoding the first sequence of LLRs 102 using a first FEC decoder; and/or generating the second sequence of bits 107 by decoding the second sequence of LLRs 106 using a second FEC decoder.

Notably, a first or second output sequence of LLRs will be obtained by iteratively decoding the first sequence of LLRs 102 for the first number of iterations, or by iteratively decoding the second sequence of LLRs 106 for the second number of iterations, respectively. Then, the first or the second output sequence of LLRs can be further converted into bits, i.e., to generate the first sequence of bits 103, or to generate the second sequence of bits 107. That is, a decoder doesn't convert LLRs to bits, a further conversion step, from LLRs into bits, is needed herein.

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the device 100 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the device 100 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

What is claimed is:

1. A device for processing an optical signal, the device comprising:
    a processor; and
    a memory coupled to the processor and having processor-readable instructions stored thereon, which are executed by the processor and cause the processor to:
        generate a first signal by equalizing the optical signal using a first digital back propagation (DBP) algorithm;
        generate a first sequence of log-likelihood ratios (LLRs) by demapping and deinterleaving the first signal;
        generate a first sequence of bits by iteratively decoding the first sequence of LLRs for a first number of iterations;
        generate a sequence of quadrature amplitude modulation (QAM) symbols by mapping and interleaving the first sequence of bits;
        generate a second signal by equalizing the first signal based on the sequence of QAM symbols using a second DBP algorithm;
        generate a second sequence of LLRs by demapping and deinterleaving the second signal; and
        generate a second sequence of bits by iteratively decoding the second sequence of LLRs for a second number of iterations.

2. The device according to claim 1, wherein the processor is further configured to:
    receive the optical signal over an optical channel; and
    perform a linear compensation on the optical signal before equalizing the optical signal.

3. The device according to claim 2, wherein the linear compensation comprises a chromatic dispersion (CD) compensation and/or a multi-input multi-output (MIMO) filter.

4. The device according to claim 1, wherein the processor is further configured to:
    generate the first signal by equalizing the optical signal using a hard sliced signal calculated from the optical signal as a reference signal.

5. The device according to claim 1, wherein the processor is further configured to:
    obtain a first output sequence of LLRs by iteratively decoding the first sequence of LLRs for the first number of iterations; and
    generate the first sequence of bits by converting the first output sequence of LLRs.

6. The device according to claim 5, wherein the processor is further configured to:
    determine an extrinsic information sequence based on the first sequence of LLRs and the first output sequence of LLRs; and
    generate the second sequence of bits by iteratively decoding the second sequence of LLRs based on the extrinsic information sequence.

7. The device according to claim 1, wherein the processor is further configured to:
    generate the first sequence of bits by iteratively decoding the first sequence of LLRs for two iterations, and/or
    generate the second sequence of bits by iteratively decoding the second sequence of LLRs for three iterations.

8. The device according claim 7, wherein the first and/or the second FEC decoder is a turbo product code (TPC) decoder, or a low-density parity-check code (LDPC) decoder.

9. The device according to claim 8, wherein the processor is further configured to:
generate the first sequence of bits by decoding the first sequence of LLRs using a first forward error correction (FEC) decoder; and/or
generate the second sequence of bits by decoding the second sequence of LLRs using a second FEC decoder.

10. The device according to claim 1, wherein the processor is further configured to:
generate the sequence of QAM symbols by performing a Gray mapping on the first sequence of bits.

11. The device according to claim 1, wherein the processor is further configured to:
generate the sequence of QAM symbols by mapping the first sequence of bits onto a quadrature amplitude modulation 16 (QAM16) constellation.

12. The device according to claim 1, wherein the processor is further configured to:
generate the first signal by equalizing the optical signal using the first DBP algorithm with a blind cross-phase modulation (XPM) compensation; and/or
generate the second signal by equalizing the first signal using the second DBP algorithm with a blind XPM compensation.

13. A method for processing an optical signal, wherein the method is applied to a hardware processor of a device, the method comprises:
generating a first signal by equalizing the optical signal using a first digital back propagation (DBP) algorithm;
generating a first sequence of log-likelihood ratios (LLRs) by demapping and deinterleaving the first signal;
generating a first sequence of bits by iteratively decoding the first sequence of LLRs for a first number of iterations;
generating a sequence of quadrature amplitude modulation (QAM) symbols by mapping and interleaving the first sequence of bits;
generating a second signal by equalizing the first signal based on the sequence of QAM symbols using a second DBP algorithm;
generating a second sequence of LLRs by demapping and deinterleaving the second signal; and
generating a second sequence of bits by iteratively decoding the second sequence of LLRs for a second number of iterations.

14. The method according to claim 13, further comprising:
obtaining a first output sequence of LLRs by iteratively decoding the first sequence of LLRs for the first number of iterations; and
generating the first sequence of bits by converting the first output sequence of LLRs.

15. The method according to claim 14, further comprising:
determining an extrinsic information sequence based on the first sequence of LLRs and the first output sequence of LLRs; and
generating the second sequence of bits by iteratively decoding the second sequence of LLRs based on the extrinsic information sequence.

16. The method according to claim 13, further comprising:
generating the first sequence of bits by iteratively decoding the first sequence of LLRs for two iterations, and/or
generating the second sequence of bits by iteratively decoding the second sequence of LLRs for three iterations.

17. The method according to claim 13, further comprising:
generating the first sequence of bits by decoding the first sequence of LLRs using a first forward error correction (FEC) decoder; and/or
generating the second sequence of bits by decoding the second sequence of LLRs using a second FEC decoder.

18. A non-transitory computer-readable medium having computer-executable instructions stored thereon, which are executed by a processor and cause the processor to perform a method for processing an optical signal comprising:
generating a first signal by equalizing the optical signal using a first digital back propagation (DBP) algorithm;
generating a first sequence of log-likelihood ratios (LLRs) by demapping and deinterleaving the first signal;
generating a first sequence of bits by iteratively decoding the first sequence of LLRs for a first number of iterations;
generating a sequence of quadrature amplitude modulation (QAM) symbols by mapping and interleaving the first sequence of bits;
generating a second signal by equalizing the first signal based on the sequence of QAM symbols using a second DBP algorithm;
generating a second sequence of LLRs by demapping and deinterleaving the second signal; and
generating a second sequence of bits by iteratively decoding the second sequence of LLRs for a second number of iterations.

19. The non-transitory computer-readable medium according to claim 18, further comprising:
obtaining a first output sequence of LLRs by iteratively decoding the first sequence of LLRs for the first number of iterations; and
generating the first sequence of bits by converting the first output sequence of LLRs.

20. The non-transitory computer-readable medium according to claim 19, further comprising:
determining an extrinsic information sequence based on the first sequence of LLRs and the first output sequence of LLRs; and
generating the second sequence of bits by iteratively decoding the second sequence of LLRs based on the extrinsic information sequence.

* * * * *